(12) United States Patent
Vasseur et al.

(10) Patent No.: US 8,774,050 B2
(45) Date of Patent: Jul. 8, 2014

(54) DYNAMIC WAKE-UP TIME ADJUSTMENT BASED ON DESIGNATED PATHS THROUGH A COMPUTER NETWORK

(75) Inventors: Jean-Philippe Vasseur, Saint Martin d'Uriage (FR); Shmuel Shaffer, Palo Alto, CA (US); Sandeep Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 12/942,962

(22) Filed: Nov. 9, 2010

(65) Prior Publication Data

US 2012/0113863 A1    May 10, 2012

(51) Int. Cl.
*H04L 12/28* (2006.01)
*H04W 84/18* (2009.01)
*H04W 40/00* (2009.01)
*H04L 29/06* (2006.01)
*H04L 29/08* (2006.01)

(52) U.S. Cl.
CPC ............ *H04W 84/18* (2013.01); *H04W 40/005* (2013.01); *H04L 29/06993* (2013.01); *H04L 29/08027* (2013.01); *H04L 29/08306* (2013.01); *H04L 67/104* (2013.01)
USPC ........................................ 370/254; 370/311

(58) Field of Classification Search
None
See application file for complete search history.

(56) References Cited

U.S. PATENT DOCUMENTS

| | | | |
|---|---|---|---|
| 6,956,865 B1 | 10/2005 | Khaunte et al. | |
| 7,415,624 B2 | 8/2008 | Miller et al. | |
| 7,472,027 B1 | 12/2008 | Batcher et al. | |
| 7,551,948 B2 | 6/2009 | Meier et al. | |
| 7,653,011 B2 | 1/2010 | Rahman et al. | |
| 7,688,953 B2 | 3/2010 | Chatterjee et al. | |
| 7,711,004 B2 | 5/2010 | Xu | |
| 7,801,092 B2 | 9/2010 | Meier | |
| 7,978,666 B2 * | 7/2011 | Keshavarzian et al. | 370/338 |
| 8,089,909 B2 * | 1/2012 | Kim et al. | 370/311 |
| 2007/0140163 A1 | 6/2007 | Meier et al. | |
| 2007/0233835 A1 * | 10/2007 | Kushalnagar et al. | 709/223 |
| 2009/0010190 A1 | 1/2009 | Gong | |
| 2009/0103564 A1 * | 4/2009 | Lee et al. | 370/470 |
| 2009/0147714 A1 * | 6/2009 | Jain et al. | 370/311 |

(Continued)

OTHER PUBLICATIONS

Polastre et al, "Versatile Low Power Media Access for Wireless Sensor Networks", SenSys 2004, Nov. 2004.*
Winter, et al., Internet Engineering Task Force (IETF) Internet Draft, entitled "RPL: IPv6 Routing Protocol for Low Power and Lossy Networks" <draft-ietf-roll-rpl-14>, Oct. 25, 2010.

(Continued)

*Primary Examiner* — Timothy J Weidner
(74) *Attorney, Agent, or Firm* — Edwards Wildman Palmer LLP; James M. Behmke; Stephen D. LeBarron (57) ABSTRACT

In one embodiment, a computer network may include nodes and at least one root node. A first subset of the nodes may be located along a designated path (a directed acyclic graph (DAG)) through the computer network to the root node, where the first subset of nodes is configured to operate according to a first wake-up timer. A second subset of the nodes that are not along the designated path are in communication to at least one node of the first subset of nodes along the designated path, and operate according to a second wake-up timer that is longer than the first wake-up timer. In this manner, second subset of nodes may be awake less often, e.g., conserving energy.

20 Claims, 8 Drawing Sheets

(56) References Cited

U.S. PATENT DOCUMENTS

| | | |
|---|---|---|
| 2009/0168703 A1* | 7/2009 | Pandey et al. .................. 370/329 |
| 2009/0175207 A1 | 7/2009 | Stephenson et al. |
| 2010/0271945 A1* | 10/2010 | Clave et al. ................. 370/230.1 |
| 2011/0134818 A1* | 6/2011 | Bae et al. ....................... 370/311 |
| 2011/0150251 A1* | 6/2011 | Solum et al. .................. 375/371 |
| 2011/0176465 A1* | 7/2011 | Panta et al. .................... 370/311 |
| 2011/0211513 A1* | 9/2011 | Coleri Eregen et al. ...... 370/311 |

OTHER PUBLICATIONS

Vasseur, et al., Internet Engineering Task Force (IETF) Internet Draft, entitled "Routing Metrics used for Path Calculation in Low Power and Lossy Networks" <draft-ietf-roll-routing-metrics-11>, Oct. 23, 2010.

Thubert, Internet Engineering Task Force (IETF) Internet Draft, entitled "RPL Objective Function 0" <draft-ietf-roll-of0-03>, Jul. 29, 2010.

\* cited by examiner

DYNAMIC WAKE-UP TIME ADJUSTMENT BASED ON DESIGNATED PATHS THROUGH A COMPUTER NETWORK

TECHNICAL FIELD

The present disclosure relates generally to computer networks, and, more particularly, to directed acyclic graph (DAG) routing and management, e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, is etc. The RPL architecture provides a flexible method by which each node performs DODAG discovery, construction, and maintenance.

Energy, in particular, is a relatively critical and scarce resource in LLNs, especially when nodes are battery powered. In such an environment, saving battery life in the network has a direct impact on battery replacement cycle length (i.e., battery life). Extending battery life also has a direct impact on the cost of operating an LLN, as it reduces the aggregated cost of replacing batteries in the field. Existing networks reduce the energy consumption of nodes by switching the nodes between "sleep" and "active" states, which are typically a manually pre-set length of time. The longer time the nodes spend in sleep mode, the less energy they consume. However, as the sleep duration increases, the delay through the network may also increase, as there may be fewer nodes active (awake) at any given time through which traffic may be relayed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computer network may comprise nodes and at least one root node. A first subset of the nodes may be located along a designated path (a directed acyclic graph (DAG)) through the computer network to the root node, where the first subset of nodes are configured to operate according to a first wake-up timer. A second subset of the nodes that are not along the designated path are in communication to at least one node of the first subset of nodes along the designated path, and operate according to a second wake-up timer that is longer than the first wake-up timer. In this manner, second subset of nodes may be awake less often, e.g., conserving energy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a kind of wireless ad-hoc network, which is generally considered a self-configuring network of mobile routes (and associated hosts) connected by wireless is links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc.) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors)

transmit their current data (or take a measurement, and transmit that result) to the sensor sink. (Those skilled in the art will appreciate the benefits and shortcomings of each mode, and both apply to the techniques described herein.)

Figure 1:
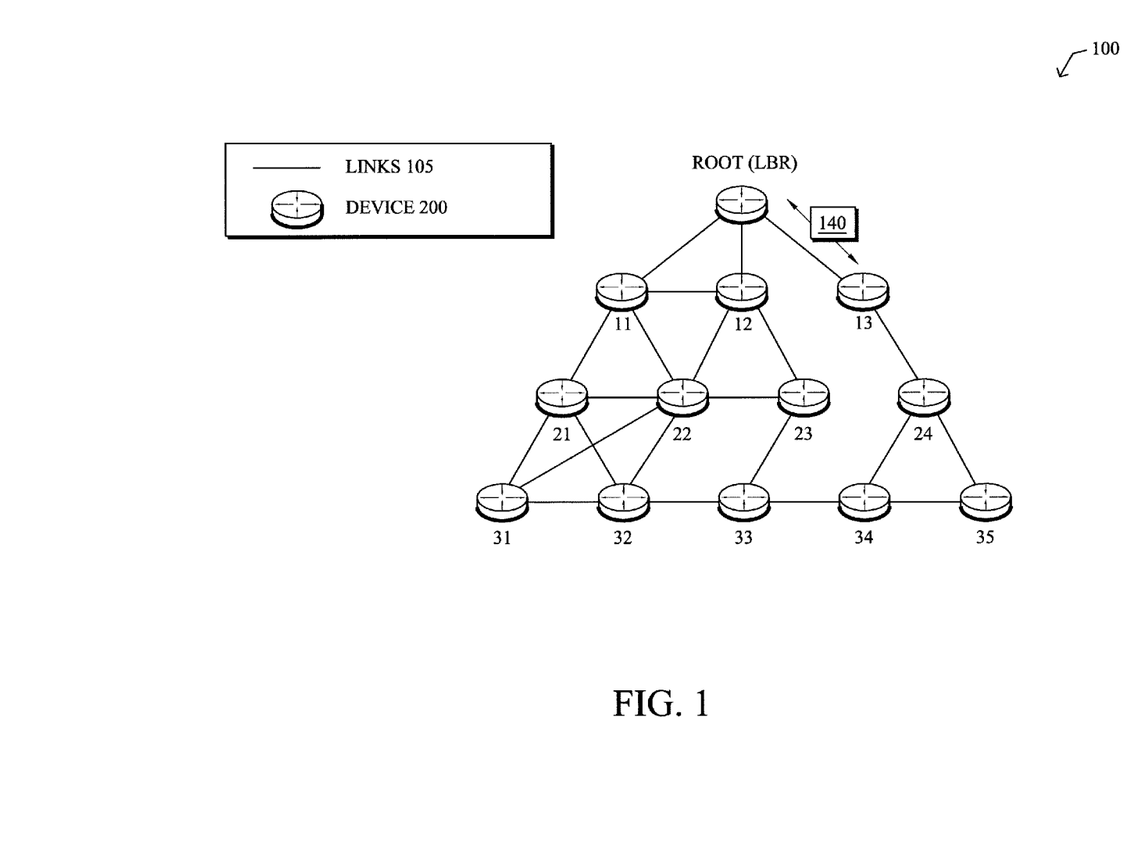
FIG. 1 illustrates an example computer network.

FIG. 1 is a schematic block diagram of an example computer network 100 illustratively comprising nodes/devices 200 (e.g., labeled as shown, "Root," "11," "12," . . . "35") interconnected by various methods of communication. For instance, the links 105 may be wired links or may comprise a wireless communication medium, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among surrounding nodes.

Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices), also referred to as LLN border routers (LBRs), while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
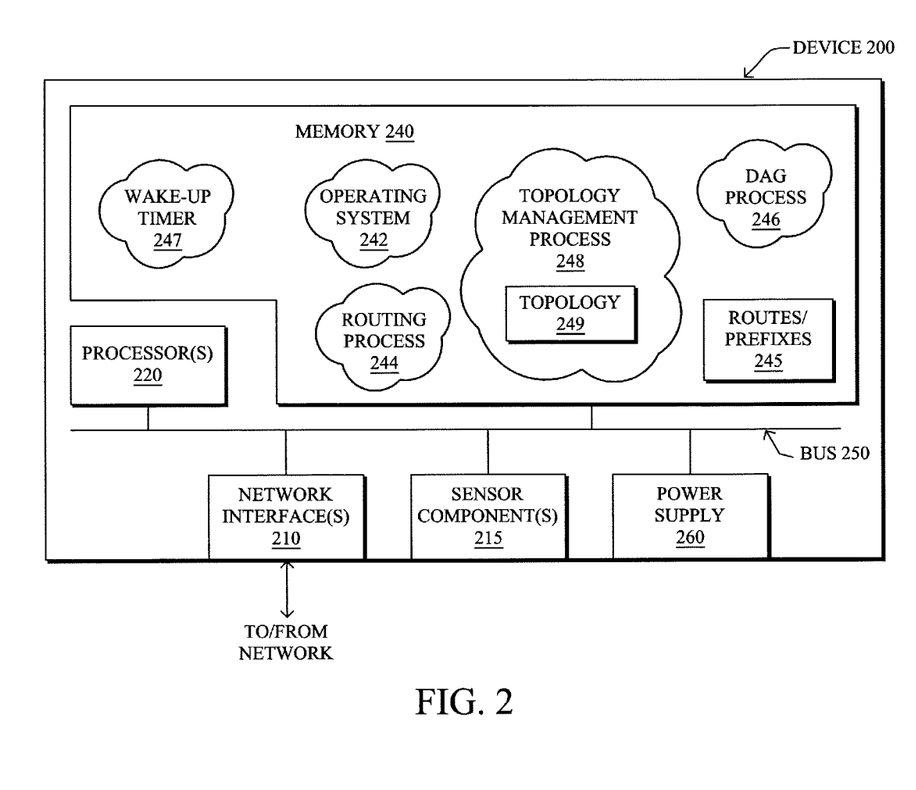
FIG. 2 illustrates an example network device/node.

FIG. 2 is a schematic block diagram of an example node/device 200 that may be used with one or more embodiments described herein, e.g., as a root node or other node (e.g., sensor) in the network. The device may comprise one or more network interfaces 210, one or more sensor components 215 (e.g., sensors, actuators, etc.), a processor 220 (e.g., an 8-64 bit microcontroller), and a memory 240 interconnected by a system bus 250, as well as a power supply 260 (e.g., battery, plug-in, etc.).

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc. Note that the root may have two different types of network connections 210. Namely, one or more interfaces may be used to communicate with the mesh network (into the mesh cell), i.e., the other nodes shown in FIG. 1, while another interface is used as a WAN uplink network interface between the root node and, for example, a head-end device located through the WAN.

The memory 240 comprises storage locations that are addressable by the processor(s) 220 and the network interfaces 210 for storing software programs and data structures associated with the embodiments described herein. As noted above, certain devices may have limited memory or no memory (e.g., no memory for storage other than for programs/processes operating on the device). The processors 220 may comprise necessary elements or logic adapted to execute the software programs and manipulate the data structures, such as routes or prefixes 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246, and a wake-up timer 247, e.g., for power-cycling devices. Also, for root devices (or other management devices), a topology management process 248 and associated stored topologies 249 may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-14> by Winter, at al. (Oct. 25, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-11> by Vasseur, et al. (Oct. 23, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
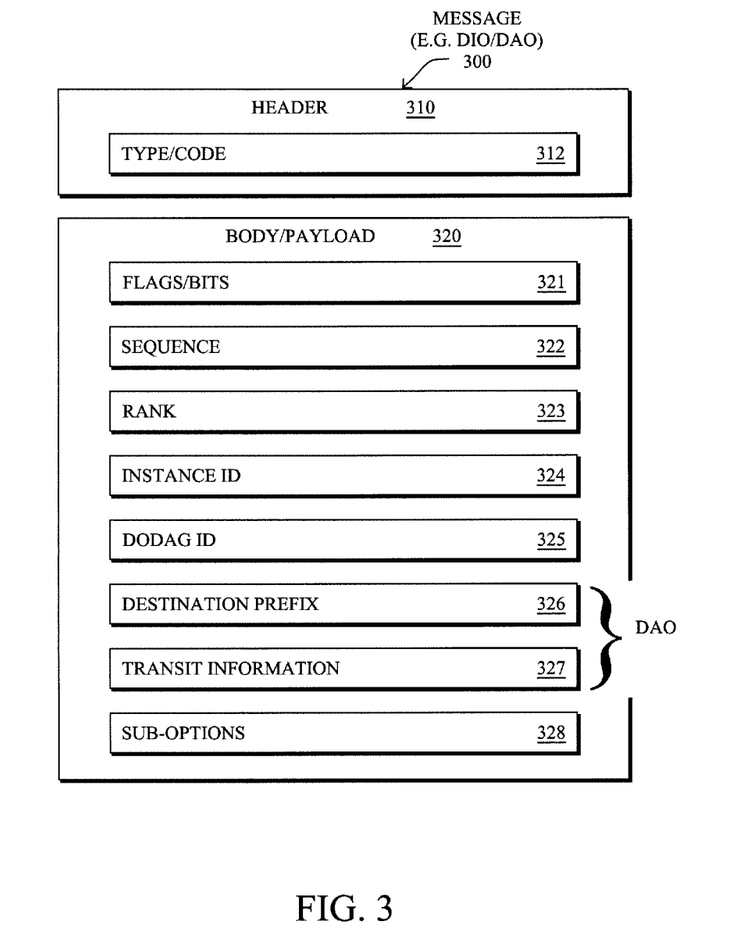
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be fields used to relay the pertinent information. In particular, the fields may comprise various flags/bits 321, a sequence number 322, a rank value 323, an instance ID 324, a DAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields may be used to carry certain information within a message 300, as may be described herein.

DAG "Highways"

As noted above, energy is a critical and scarce resource in LLNs, especially when nodes are battery powered. In such an environment, saving battery life in the network is critical since it has a direct impact on how long it will last before it needs to be replaced. Existing (non-synchronized) networks reduce the energy consumption of nodes by switching the nodes between "sleep" and "active" states (e.g., a 5% duty cycle, waking once a second, etc.). The longer time the nodes spend in sleep mode, the less energy they consume. However, as the sleep duration increases, the delay through the network may also increase, as there may be fewer nodes active (awake) at any given time through which traffic may be relayed. Furthermore, when a node needs to transit a message to a neighbor knowing its wake-up time, it needs to add a preamble that lasts at least the duration of the wake-up time of its neighbor to make sure that the neighbor will be awake when the packet content transmission will actually start. Additionally, in existing systems, the wakeup period "W" is often fixed for all nodes in the network, as it is not practical to adjust sometimes millions of nodes manually.

According to one or more additional embodiments of the disclosure, therefore, a first subset of nodes may be located along a designated path (e.g., a DAG "highway") through the computer network to the root node, where the first subset of nodes ("highway nodes") are configured to operate according to a first wake-up timer. A second subset of the nodes that are not along the designated path ("secondary nodes") are in communication to at least one node of the first subset of nodes along the designated path, and operate according to a second wake-up timer that is longer than the first wake-up timer. In this manner, second subset of nodes may be awake less often, e.g., conserving energy.

In other words, according to techniques herein, a designated path may be formed among a subset of all the nodes where each elected node on the path (e.g., a "highway") would wake up more often. Thus, a node that is not on the designated path would wake up much less often, thus saving energy (e.g., battery), and communicates with a node on the designated path to relay a message within the network. Also, as described herein, as batteries of nodes on the designated path approach a threshold of energy depletion (e.g., 30% of the total energy remaining), the techniques may reform the path by rebuilding the DAG highways within nodes whose energy is above an energy threshold.

Illustratively, the techniques described herein may be performed by hardware, software, and/or firmware, such as in accordance with a topology management process 248 for computing (e.g., root) device functionality, which may contain computer executable instructions executed by the processor 220 to perform functions relating to the novel techniques described herein, e.g., in conjunction with routing process 244 and DAG process 246. Further, non-root nodes within the DAG may perform the techniques herein in accordance with DAG process 246, e.g., configured specifically to perform the functions herein to adjust wake-up timers 247 based on the designated paths ("highways") through the network.

Operationally, one or more embodiments herein are based on dynamically establishing a set of designated paths called "highways" that will capture and relay traffic (140) from every node to the DAG root. Notably, as described below, designated paths may not always follow the "shortest" path. Generally speaking, the designated path is a high volume traffic path to which lower "secondary" traffic paths may feed data packets. The techniques utilize a first (e.g., conventional) wake-up period W1 for nodes which are part of the designated path, and a longer wake-up period W2 for nodes which are not part of the designate path and are used for lower traffic volume in order to save energy. Notably, when a RPL routing protocol is used, the process of constructing the LLN DAG in accordance with the embodiments herein may be initiated by the DAG root (LBR). When other routing protocols are used, or for alternative embodiments of RPL, the process may be initiated either by a specific node (such as the root of the DAG), by an application in the data center, or by a hybrid distributed intelligence in the network, collectively referred to herein simply as a "computing device."

Figure 4:
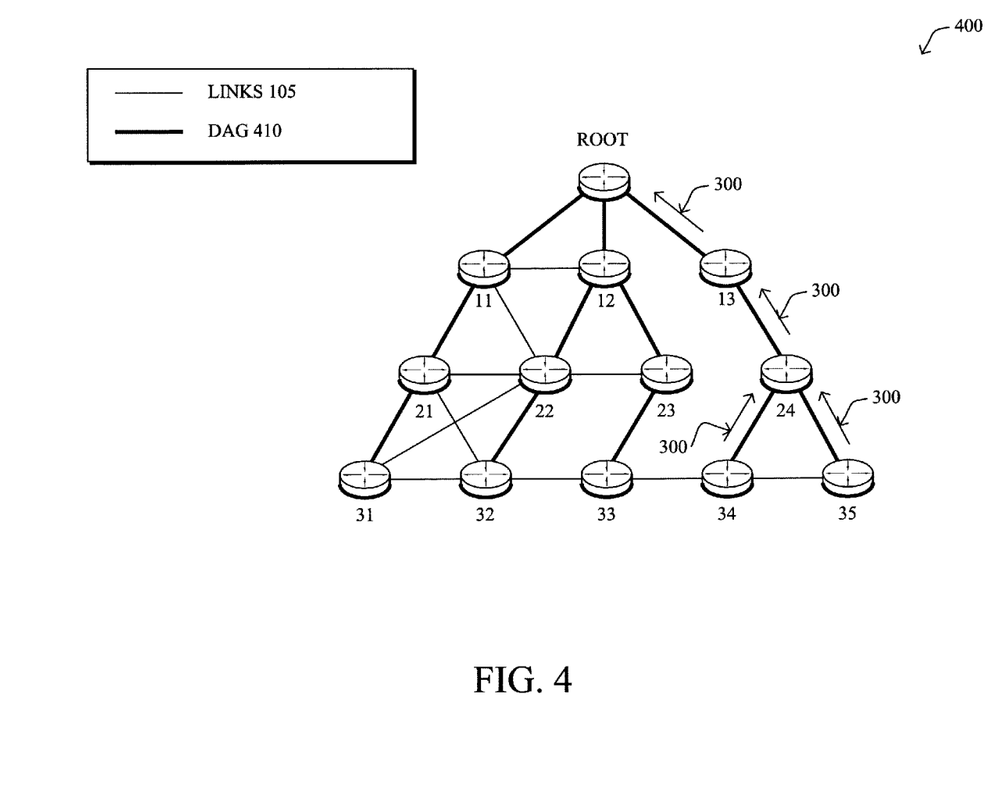
FIG. 4 illustrates an example network showing a directed acyclic graph (DAG)

With reference to FIG. 4, an example routing topology, e.g., DAG 410, is shown that may be computed within network 100 by an existing routing protocol. In this example, the routing topology may be generally optimized for specific routing metrics, such as delay, signal strength, hop count (or rank), etc. Generally, DAG 410 is established by passing DAG messages 300 within the network as described above. In a similar manner, according to one or more embodiments herein, the root node (or computing device) may learn of all of the nodes (nodes 11-35) in the network, e.g., and their associated topology (reachability). That is, nodes may relay topology information toward the root node according to a DAG routing process as described above.

As noted, in (non-synchronized) existing systems, all nodes in the network use the same wake-up time value. In accordance with one or more embodiments herein, however, designated (e.g., "highway") paths are established in order to provide network connectivity, e.g., without an explicit attempt to reduce the path delay. Rather, emphasis is placed on reducing the power consumed by the nodes and consequently prolonging the life of batteries in the network. It should be noted, for example, that in many networks such as water and gas metering data collection, it is more important to prolong the life of batteries in the network than to reduce the delay through the network.

Specifically, the computing device, e.g., root node, may determine the designated paths based on a number of factors, described below. The designated path through the computer network, when determined, traverses a first subset of the nodes ("highway nodes") as a DAG toward the root node. A second subset of the nodes ("secondary nodes") are not along the designated path and are in communication to (can reach) at least one node of the first subset of nodes along the designated path. Specifically, in one aspect of the embodiments herein, a secondary node is a node that is not on the path, and thus usually does not need to relay data from any children nodes. Accordingly, as described below, the secondary nodes need only awaken when they themselves need to send a message (or less occasionally to possibly receive a message, e.g., depending upon the type of network). A goal of the designated path determination/computation may be to maximize the number of secondary nodes in a network, even if this leads to an increased delay of information traversed through the network.

As mentioned, various factors may be used when determining the designated path. For instance, nodes that must receive traffic from one or more children (without alternative parent options) would generally need to be on the designated path, and nodes that would not ever receive traffic from a child need not be on the designated path. Apart from these two extremes, various selection algorithms may be used to determine an appropriate set of highway nodes and secondary nodes. For instance, whether a node is power constrained or not (e.g., batter operated or "plugged in") may be prioritized over the cost or delay of the path. Other factors may also make certain nods more "capable" to be highway nodes, such as remaining battery power, available bandwidth, processing power, wireless communication speeds, etc., and the selection algorithm may thus prefer these more capable nodes over less capable nodes. (Note that the computing device may be informed of these capabilities/attributes through messages 300 during network discovery.) Further, certain nodes may simply indicate directly whether they are capable of (or willing to) participate as a highway node.

In addition to node attributes and capabilities, the computing (e.g., root) node may have enhanced knowledge of the network, such as the topology and certain traffic metrics, e.g., traffic rates, bandwidth utilization, etc., and may make an intelligent choice of highway nodes for the designated path based on this information. For instance, the computing node may establish the designated path based on how much traffic a node is projected to route, or how many children a node has (e.g., those over a certain threshold may be preferred on the path). Those skilled in the art will appreciate that the example selection algorithms and preferences are merely examples, and are not meant to limit the scope of the embodiments herein. Also, various well-known algorithms, such as "spanning tree," can be used to build the designated paths.

Figure 5:
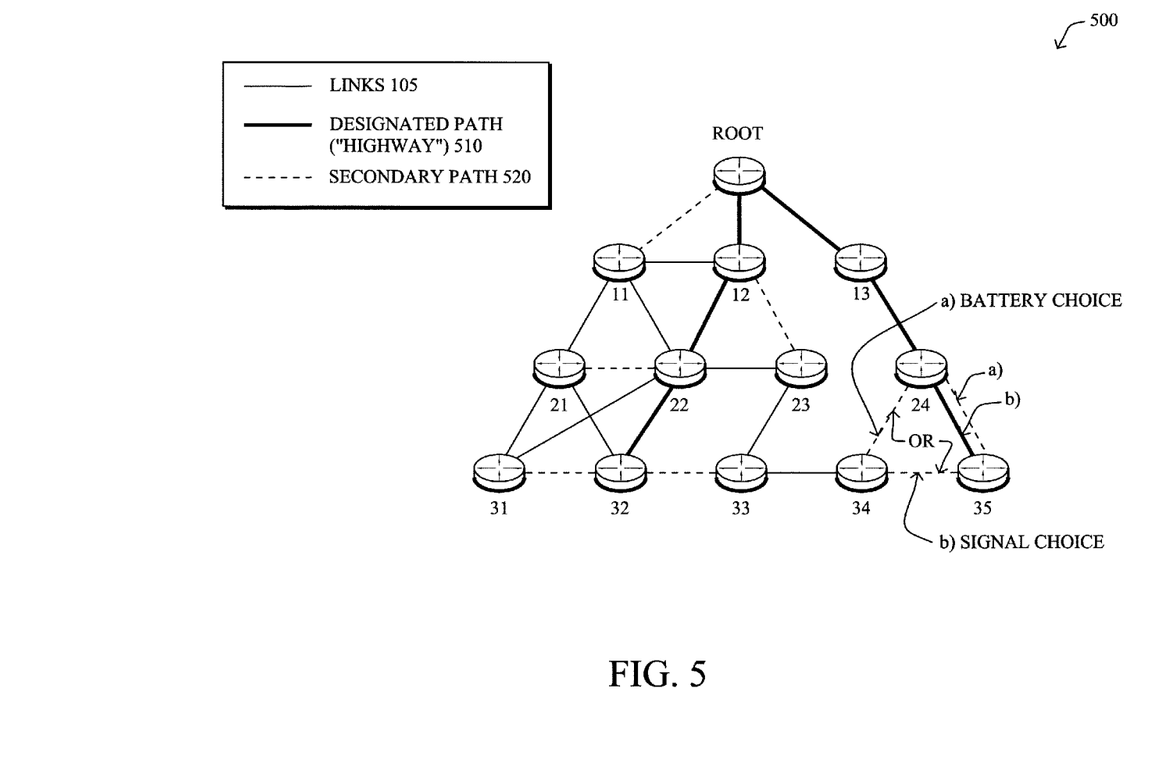
FIG. 5 illustrates an example network showing a designated path (e.g., highway)

FIG. 5 illustrates an example network showing a designated path 510 in place of DAG 410. Specifically, the designated path includes highway nodes 12, 22, and 32 down one branch, and nodes 13, 24, and 35 in another. The remaining nodes in the network are secondary nodes (11, 21, 23, 31, 33, and 34), and can communicate with the network (e.g., toward the root) through a respective "secondary path" 520 to a highway node, and thus to the designated path (the "highway").

The decision for the secondary paths 520 may also be based on a number of factors. For example, in one embodiment, secondary paths remain within a same rank (e.g., 31 communicates with 32, not 22). In another embodiment, secondary paths are based on maintaining best battery consumption, such as shortcutting paths to higher ranks (e.g., 34 communicating with 24, bypassing node 35, option "a"). Alternatively, secondary paths may be based on a best signal (e.g., signal strength, packet loss, etc.), such as where node 34 communicates with node 35 (option "b"). Note that under option "a", node 35 need not be (though may still be) on the designated path 510, as no nodes would use node 35 as a relay toward the root.

Once the designated path 510 is determined, all nodes in the network are notified whether they are on a designated path or not. For example, in accordance with an illustrative embodiment, a new flag 321 may be defined in the DIO (e.g., RPL) message 300 that notifies each node regarding its place with respect to designated paths (e.g., in the first or second subset). Alternatively, a new listing (e.g., of the first subset, second subset, or first and second subsets) may be included within an additional option field 328. Note that the neighbor table in each node (e.g., routes/prefixes table 245) may be enhanced to capture whether neighboring nodes are part of the designated path or not. Again, as noted above, nodes which are notified that they are part of the designated path (e.g., 12, 22, 32 and 13, 24, 35) may self configure to have a wakeup time W1, while nodes that are not part of the designated path (e.g., 11, 21, 23, 31, 33, and 34) set their wake-up time to W2, where W2>>W1. Notably, within the notification, the values of W2 (e.g., and W1) may be included, such that this value may also be dynamically adjusted.

From another perspective, each particular node may receive the notification (e.g., message 300) of a designated path 510. From the notification, each node may determine whether it is on the designated path or not; that is, whether it is in the first subset or second subset. Accordingly, the nodes may configure (e.g., adjust) their wake-up timers 247 to operate according to a first wake-up timer W1, or according to a longer second wake-up timer W2 depending upon their role in the network. Note also that the secondary paths 520 may also be determined by the computing/root device and relayed to the non-highway nodes, or, alternatively, the secondary paths may be dynamically determined by the non-highway nodes themselves. For example, the notification may simply indicate the highway nodes, at which time non-highway nodes would need to locate a "best" highway node with which to communicate. The non-highway nodes may then, optionally, inform the root node of the particular secondary path chosen.

Given the generally unidirectional nature of certain networks, such as sensor networks (e.g., for gas and water consumption measurement, where gas/water meters send a reading once or twice per day) nodes may be configured to wake up only when they need to transmit data to the root. That is, specifically, nodes that are not on highways continue to wake up as soon as they need to send a packet and send that packet to nodes on highways. That being said, it is worth pointing out that even if a node selects a longer wake-up time W2, it is still possible to send a packet to this node simply by increasing the preamble of the packet to a value slightly longer than W2. For example node 31 no longer uses the shortest route via 21. Rather it sends its data via node 32, which is on the highway path. This allows the system to concentrate traffic through highway nodes with nominal wakeup time W1. For nodes that are not on highways, it saves energy by increasing their wake-up time to W2.

According to an aspect of the techniques herein, if a node needs to transmit a packet to a neighbor, the communication includes a message preamble (e.g., a wireless signal used to indicate to a receiving device that a transmission is ensuing) that is longer than the wake-up timer of the receiving node. For example, if the receiving node does not belong to the highway, the preamble size may be adjusted to be slightly longer than W2 to ensure the receiving node is awake at least once during the preamble. Generally, however, since most of the traffic would be sent to the designated path and toward the root in many embodiments, the preamble most often is slightly longer than W1, unless communication to a non-highway node is required.

If a node on the designated path determines that a power constraint or other attribute is below a threshold (e.g., the node is running low on battery, suffering bandwidth congestion, etc.), then it may send a message (e.g., 300) to its neighbors with a request to rebuild the designated path, removing the particular node from the highway path. Alternatively the node may notify the DAG root of the request, which may then initiate the DAG designated path rebuilding process.

Figure 6:
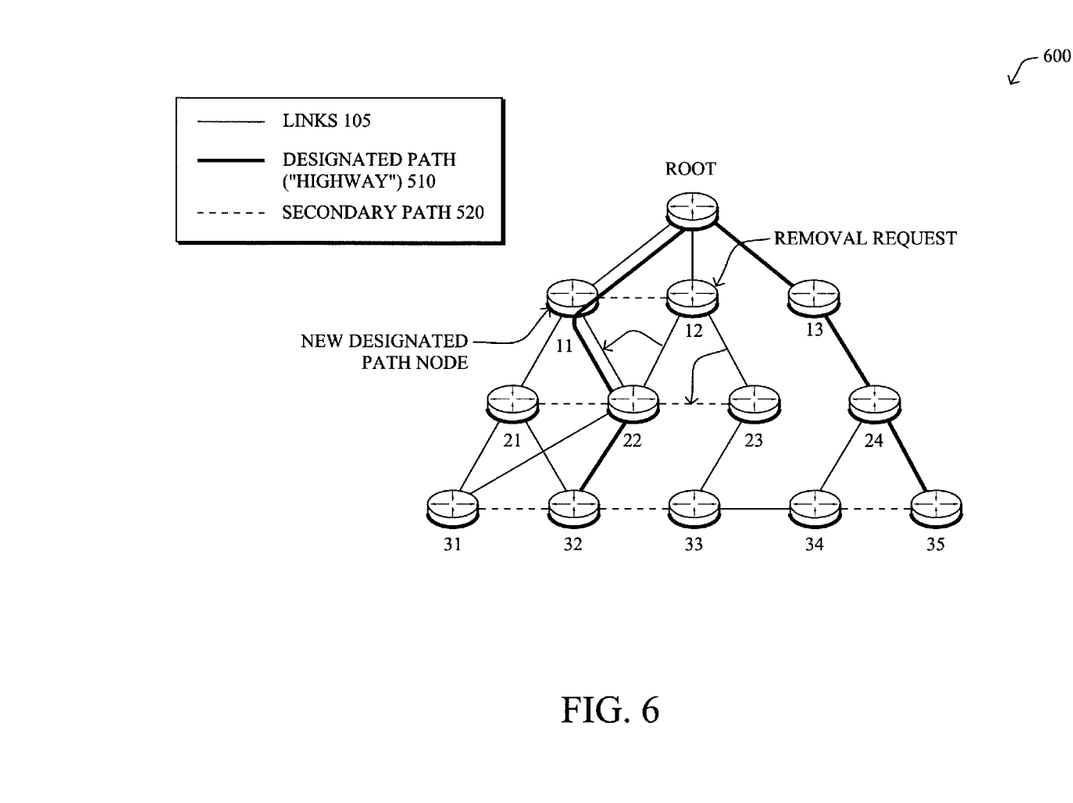
FIG. 6 illustrates an example network showing a recomputed designated path.

For example, with reference to FIG. 6, assume that node 12 is running low on battery. Node 12 triggers the path rebuilding process either directly by notifying its neighbors or indirectly by notifying the DAG root. As a result, the techniques herein may identify another node (node 11 in this example) as a new designated path node and notifies all of the children of node 12, as well as any neighbors of node 11, about this new highway path. Node 12 is thus removed from the designated highway path, and can preserve its battery by adjusting its wakeup timer to W2. Node 11, which has sufficient battery life, becomes part of the designated highway path, and correspondingly adjusts its wakeup time to W1.

In other words, in response to receiving a request to remove a node from the designated path, other nodes may locally recompute communication with the designated path, e.g., finding a new "parent" node on the path (as did node 23), or actually joining the path (as did node 11). Alternatively, the request may be received by the root node (or computing node), at which time the root node may determine a new designated path that does not include the particular requesting node, and notifies the network of the new decision, accordingly.

Figure 7:
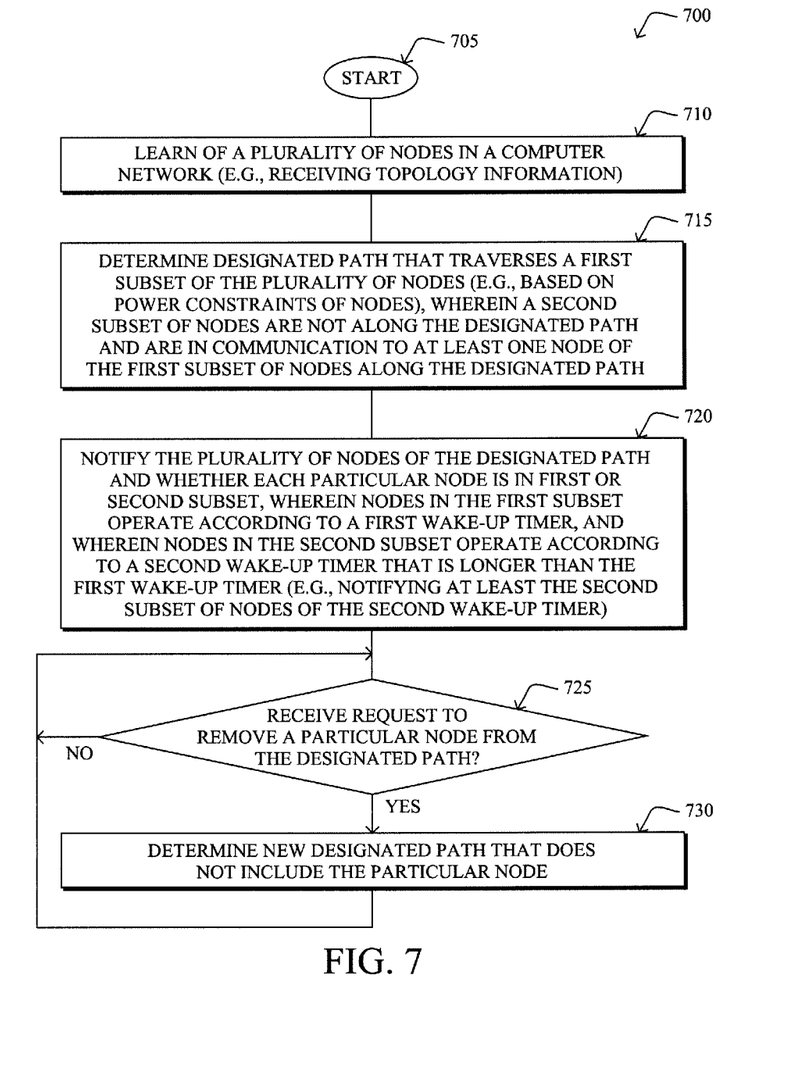
FIG. 7 illustrates an example simplified procedure for creating a designated path.

FIG. 7 illustrates an example simplified procedure for creating designated paths (e.g., highways) in accordance with one or more embodiments described herein. The procedure 700 starts at step 705, and continues to step 710, where a computing device (e.g., a root node, head-end node, or other computational node) may learn of or otherwise assess information revealing nodes in a computer network, such as through receiving topology information in DAO messages 300. In step 715, the computing device determines a designated path that traverses a first subset of the nodes ("highway nodes"), for example, based on power constraints of the nodes. As described above, a second subset of nodes that are not along the designated path ("secondary nodes") are able to communicate with at least one of the first subset of nodes along the designated path.

Once the designated path is computed, in step 720, the computing device may notify the nodes of the designated path, and thus whether each particular node is in the first or second subset. Specifically, as described in detail above, nodes in the first subset operate according to a first wake-up timer (e.g., a conventional timer), and nodes in the second subset operate according to a second wake-up timer that is longer than the first wake-up timer. Illustratively, the notification may include the actual second wake-up timer, or else the first and second timers are locally configured on the nodes. In the event the computing device receives a request to remove a particular node from the designated path in step 725, then in step 730, a new designated path may be determined that does not include the particular node, and the neighboring nodes may be notified of the new path, accordingly. The procedure 700 may continue to await changes to the designated path in step 725 (e.g., from nodes losing battery life or other causes).

Figure 8:
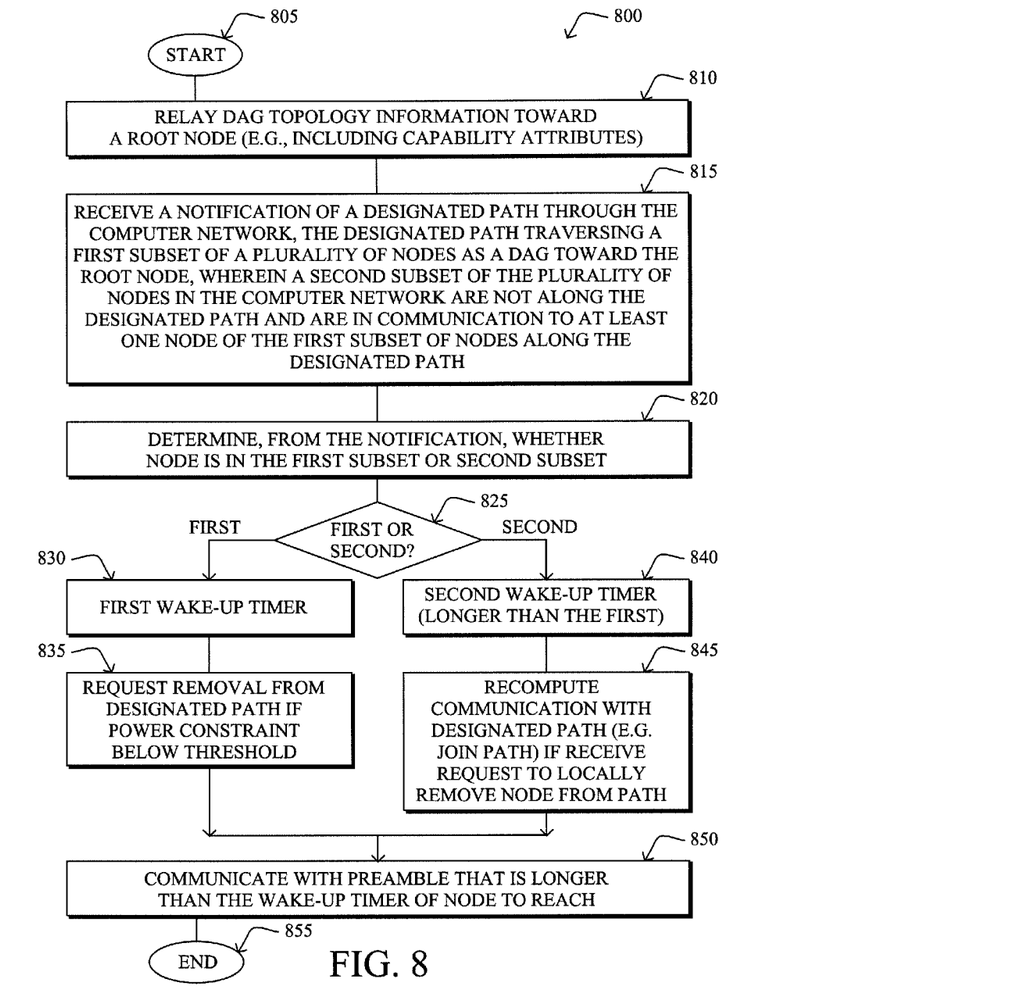
FIG. 8 illustrates an example simplified procedure for operating according to designated path functionality.

In addition, FIG. 8 illustrates an example simplified procedure for participating in a network with designated path (e.g., highway) operation in accordance with one or more embodiments described herein, such as from the perspective of a node. The procedure 800 starts at step 805, and continues to step 810, where, optionally, the node may relay DAG topology information toward a root node. For instance, as described above, the information may also include various capability attributes, such as power type, battery level, bandwidth, capability to participate as either a highway or off-highway node, etc. In step 815, the node may receive a notification of a designated path through the computer network, where, as described above, the designated path traverses a first subset of nodes as a DAG toward the root node, and a second subset of the nodes in the computer network that are not along the designated path are in communication to at least one node of the first subset of nodes along the designated path.

Based on the notification, in step 820 the node may determine whether it is in the first subset or second subset. If in step 825 the node is in the first subset, then in step 830 the node is configured to operate according to a first wake-up timer. While operating as a node along the designated path (first subset/highway node), in step 835 the node may request removal from the designated path if its power constraint (e.g., battery level) falls below a certain threshold.

If in step 825 the node is in the second subset, then in step 840 the node is configured to operate according to a second wake-up timer that is longer than the first wake-up timer, as described above. If, during operation off the designated path (second subset/off-highway node), a request is received to locally remove a node from the designated path, then in step 845 communication with the designated path may be recomputed. For example, as noted above, this may imply finding a new highway node to communicate with, or, perhaps, becoming a highway node itself (e.g., either a local repair, or informing the computing node of the change).

Regardless of whether the node is along the designated path or not, when communicating with another node in the computer network in step 850, a preamble may be used that is longer than the wake-up timer of node being reached in order to ensure that the node is awake to hear the message. For instance, the preamble may be longer than the first wake-up timer when communicating with a node along the designated path, and longer than the second wake-up timer when communicating with a node not along the designated path. The procedure 800 ends in step 855 (e.g., continuing to communicate messages and/or changing the designated path as necessary).

The novel techniques described herein create a designated path (e.g., highway) through a computer network, where nodes not along the designated path are allowed to conserve energy. In particular, by assigning two wake-up timers, the novel techniques reduce overall power consumption and as also the operational cost associated with replacing batteries of devices in the field. Further, the one or more dynamic aspects of the embodiments above, such as highway node selection, rebuilding the highway based on current power constraints, etc., alleviate the need for cumbersome and inefficient manual configuration.

Other mechanisms to save energy in LLNs have been proposed, such as routing based on power source (avoiding routing of packets through battery powered nodes), routing based on battery power (avoiding routing of packets through nodes with low battery power), however both of these methods provide only minimal improvement when all of the nodes in a network (mesh cell) are battery operated. Still other mechanisms may synchronize awake times between nodes (e.g., in a centralized or distributed manner), though these mechanisms still utilize a fixed wake-up periodicity for all nodes. The major drawback of such an approach is that many nodes would wake-up even if there is no traffic to receive and a number of times nodes in the network would wake would be unnecessarily large. The embodiments herein, on the other hand, provide substantial improvement for battery operated networks, and dynamically adjusts wake-up timers such that nodes not expecting to receive packets may wake up less often, and thus conserve more energy.

While there have been shown and described illustrative embodiments that create a designated path (e.g., highway) through a computer network it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not so limited, and may, in fact, be used with other types of networks and/or protocols utilizing DAG routing (e.g., distance vector protocols). Further, while the examples above utilize a first and second (longer) wake-up timer, the second wake-up timer may comprise times that are longer than the first wake-up timer, e.g., being specific to each particular node. In this instance, communication to those off-highway nodes (second subset node) may either be based on the longest possible second timer value, or may be specific to the particular off-highway node being reached (if known).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
accessing information revealing nodes in a computer network;
determining a designated path through the computer network to a root node, the designated path traversing a first subset of the nodes as a directed acyclic graph (DAG) toward the root node, wherein a second subset of the nodes in the computer network that are not along the designated path are configured to communicate with at least one node of the first subset of nodes along the designated path to reach a root node;
notifying the nodes in the computer network of the designated path and whether each particular node is included in the first subset or second subset, wherein all nodes in the first subset that are part of the designated path operate according to a first wake-up timer, and wherein all nodes in the second subset that are not part of the designated path operate according to a second wake-up timer that is longer than the first wake-up timer so that the second subset awakes less often than the first subset; and
adjusting, at a particular node of the second subset of nodes, a preamble size to be longer than the second wake-up timer.

2. The method as in claim 1, further comprising:
notifying at least the second subset of nodes of the second wake-up timer.

3. The method as in claim 1, further comprising:
identifying one or more power constrained nodes of the nodes in the computer network; and
determining the designated path to maximize a number of power constrained nodes within the second subset of nodes.

4. The method as in claim 3, further comprising:
prioritizing power constraints over at least one of either cost and delay when determining the designated path.

5. The method as in claim 1, wherein determining the designated path further comprises:
identifying one or more first nodes of the nodes in the computer network that are more capable of being on the designated path than one or more second nodes; and
giving preference to including the one or more first nodes on the designated path over the one or more second nodes.

6. The method as in claim 1, further comprising:
receiving a request to remove a particular node of the first subset of nodes from the designated path; and
determining a new designated path that does not include the particular node.

7. An apparatus, comprising:
one or more network interfaces;
a processor coupled to the one or more network interfaces and adapted to execute one or more processes; and
a memory configured to store the one or more processes executable by the processor, the one or more processes when executed operable to:
determine nodes in a computer network;
determine a designated path through the computer network to a root node, the designated path traversing a first subset of the nodes as a directed acyclic graph (DAG) toward the root node, wherein a second subset of the nodes in the computer network are not along the designated path and are in communication with at least one node of the first subset of nodes along the designated path to reach the root node;
notify the nodes in the computer network of the designated path and whether each particular node is included in the first subset or second subset, wherein all nodes in the first subset that are part of the designated path operate according to a first wake-up timer, and wherein all nodes in the second subset that are not part of the designated path operate according to a second wake-up timer that is longer than the first wake-up timer so that the second subset awakes less often than the first subset; and adjust, at a particular node of the second subset of nodes, a preamble size to be longer than the second wake-up timer.

8. The apparatus as in claim 7, wherein the one or more processes when executed is further operable to:
receive topology information from the nodes in the computer network.

9. The apparatus as in claim 7, wherein the one or more processes when executed is further operable to:
notify at least the second subset of nodes of the second wake-up timer.

10. The apparatus as in claim 7, wherein the one or more processes when executed to determine the designated path is further operable to:
identify one or more power constrained nodes of the nodes in the computer network; and
determine the designated path to maximize a number of power constrained nodes within the second subset of nodes.

11. A method, comprising:
relaying, from a particular node in a computer network, topology information toward a root node according to a directed acyclic graph (DAG) routing process;
receiving, at the particular node, a notification of a designated path through the computer network, the designated path traversing a first subset of nodes as a DAG toward the root node, wherein a second subset of nodes in the computer network are not along the designated path and are in communication with at least one node of the first subset of nodes along the designated path to the root node;
determining, from the notification, whether the particular node is in the first subset or second subset;
in response to the particular node being in the first subset which is part of the designated path, operating the particular node according to a first wake-up timer;
in response to the particular node being in the second subset which is not part of the designated path, operating the particular node according to a second wake-up timer that is longer than the first wake-up timer so that the second subset awakes less often than the first subset;
adjust, at the particular node, a preamble size to be longer than the second wake-up timer.

12. The method as in claim 11, further comprising:
informing the root node of the particular node's capability to be within the first subset of nodes along the designated path.

13. The method as in claim 11, further comprising:
communicating from the particular node to a second particular node of the second subset by communicating a message preamble that is longer than the second wake-up timer.

14. The method as in claim 11, further comprising:
determining, when the particular node is in the first subset along the designated path, that a power constraint of the particular node is below a threshold; and, in response,
requesting removal of the particular node from the designated path.

15. The method as in claim 11, further comprising:
receiving a request at the particular node to locally remove a node from the designated path; and, in response,
recomputing communication with the designated path.

16. The method as in claim 15, wherein recomputing comprises:
becoming a member of the first subset of nodes along the designated path.

17. An apparatus, comprising:
one or more network interfaces;
a processor coupled to the one or more network interfaces and adapted to execute one or more processes; and
a memory configured to store the one or more processes executable by the processor, the one or more processes when executed operable to:
relay topology information toward a root node according to a directed acyclic graph (DAG) routing process;
receive a notification of a designated path through a computer network, the designated path traversing a first subset of nodes as a DAG toward the root node, wherein a second subset of nodes in the computer network are not along the designated path and are in communication with at least one node of the first subset of nodes along the designated path to reach the root node;
determine, from the notification, whether the apparatus is in the first subset or second subset;
operate according to a first wake-up timer in response to the apparatus being in the first subset which is part of the designated path;
operate according to a second wake-up timer that is longer than the first wake-up timer in response to the apparatus being in the second subset which is not part of the designated path so that the second subset awakes less often than the first subset; and
adjust a preamble size to be longer than the second wake-up timer.

18. The apparatus as in claim 17, wherein the process when executed is further operable to:
determine, when the apparatus is in the first subset along the designated path, that a power constraint of the apparatus is below a threshold; and, in response,
request removal of the apparatus from the designated path.

19. A system, comprising:
nodes in a computer network;
a root node in the computer network;
a first subset of the nodes, wherein a designated path through the computer network to the root node traverses the first subset of the nodes as a directed acyclic graph (DAG) toward the root node, all of the first subset of nodes which are part of the designated path configured to operate according to a first wake-up timer; and
a second subset of the nodes, wherein the second subset of nodes are not along the designated path and are in communication to at least one node of the first subset of nodes along the designated path, all of the second subset of nodes which are not part of the designated path configured to operate according to a second wake-up timer that is longer than the first wake-up timer so that the second subset awakes less often than the first subset, wherein a preamble size is adjusted at a particular node of the second subset of nodes to be longer than the second wake-up timer.

20. The system as in claim 19, wherein one or more of the nodes in the computer network are sensor devices.

* * * * *